United States Patent Office 3,442,901
Patented May 6, 1969

3,442,901
DIMETHYL-OXO-SURFURYLENE
DERIVATIVES
Horst Koenig and Horst Metzger, Ludwigshafen (Rhine),
Germany, assignors to Badische Anilin- & Soda-Fabrik
Aktiengesellschaft, Ludwigshafen (Rhine), Germany
No Drawing. Filed July 19, 1965, Ser. No. 473,154
Int. Cl. C07c 161/00, 147/14; C07d 31/48
U.S. Cl. 260—294.8        9 Claims

ABSTRACT OF THE DISCLOSURE

Production of sulfur-containing compounds by reacting oxosulfonium ylides with acylating agents and the new sulfur-containing compounds themselves. The new products are polymerization modifiers and intermediates for production of pharmaceuticals, dyes and pesticides.

---

This invention relates to a new process for the production of compounds containing sulfur. It further relates to the new and valuable compounds obtainable by the new process.

We have found that sulfur-containing compounds having the general formula:

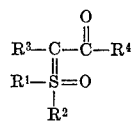

in which $R^1$ and $R^2$ denote alkyl or aralkyl, $R^3$ denotes hydrogen, alkyl, aralkyl, the acyl radical

or the carbonamide radical

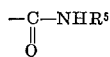

$R^5$ denoting alkyl, aralkyl, aryl or a heterocyclic five- to six-membered quasi-aromatic ring, in which $R^4$ denotes hydrogen, alkyl, alkyl substituted by one to three halogen atoms, cycloalkyl, cycloalkyl substituted by one to three halogen atoms, aryl, aryl substituted by one to three halogen atoms, aralkyl, a heterocyclic five- to six-membered quasi-aromatic ring being unsubstituted or substituted by one to three halogen atoms, alkoxy or the radical

$R^7$ and $R^8$ denoting hydrogen or phenyl, are obtained when an oxosulfonium ylide having the general formula:

in which $R^1$, $R^2$ and $R^3$ have the meanings given above is reacted, if desired in the presence of an inert solvent, at temperatures of from —30° to +150° C. with an acylating agent having the general formula:

in which $R^4$ has the meaning given above and $R^6$ denotes chlorine, bromine or the radical —O—CO—$R^9$, wherein $R^9$ denotes alkyl, alkyl substituted by one to three halogen atoms, cycloalkyl, cycloalkyl substituted by one to three halogen atoms, aryl, aryl substituted by one to three halogen atoms, aralkyl, a heterocyclic five- to six-membered quasi-aromatic ring or alkoxy, or with an acylating agent having the general formula:

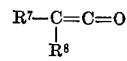

in which $R^7$ and $R^8$ have the meanings given above, with or without a base.

Dimethyl-oxo-sulfonium methylide which is accessible from trimethyloxosulfonium salts with strong bases (J. Am. Chem. Soc., 84 (1962) 867) is particularly suitable as an initial material having the Formula II. By alkylating this ylide, for example with alkyl halides or esters of sulfuric acid, further trialkyl-oxo-sulfonium salts are obtained which in turn may be converted with strong bases into the corresponding ylides. Ylides having the Formula II in which the radical $R^3$ denotes the carbonamido group may be prepared in a very convenient way by reaction of oxosulfonium ylides with isocyanates. Preferred starting materials having the Formula II are for example those in which the radicals $R^1$ and $R^2$ denote alkyl groups having one to four carbon atoms or aralkyl groups having seven to ten carbon atoms. In the preferred starting materials having the Formula II, the radical $R^3$ denotes hydrogen, alkyl having one to four carbon atoms or aralkyl having seven to ten carbon atoms. Moreover the radical $R^3$ in the preferred initial materials having the Formula II denotes the acyl radical

in which $R^5$ denotes an alkyl radical having one to ten, preferably one to five carbon atoms, an aralkyl radical having seven to thirteen carbon atoms, an aryl radical having six to twelve carbon atoms or a heterocyclic quasi-aromatic five- or six-membered ring which contains one or two nitrogen, oxygen or sulfur atoms as members of the ring. Furthermore the radical $R^3$ may denote the carbonamide group

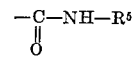

in which $R^5$ has the above meaning. Examples of preferred starting materials having the Formula II are dimethyl-oxo-sulfonium methylide, dimethyl-N-phenyl-carbamoyl-oxo-sulfonium ylide, dimethyl-benzoyl-oxo-sulfonium ylide, dimethyl-oxo-sulfonium-β-phenylethylide, 4 - methyl - oxazoyl - 5 - dimethyl - oxo - sulfonium methylide, p-chlorobenzoyl-dimethyl-oxo-sulfonium methylide, valeroyl-oxo-sulfonium methylide, diphenyl-acetyl-dimethyl-oxo-sulfonium methylide, 2-chinoyl-dimethyl-oxo-sulfonium methylide, 2-benzthiazoyl-dimethyl-oxo-sulfonium methylide, N-phenylethyl-carbamoyl-dimethyl-oxo-sulfonium methylide, or dibromonaphthoyl-6-dimethyl-oxo-sulfonium methylide.

The acylating agents used are carboxylic acid derivatives which are capable of reacting with the ylide having the Formula II. Examples of such carboxylic acid derivatives are carboxylic acid anhydrides, carboxylic acid halides, i.e. chlorides and bromides, or ketenes. Esters of chloroformic acid are also suitable. It is preferred to use the anhydrides, chlorides or bromides of fatty acids having two to eleven carbon atoms, of araliphatic monocarboxylic acids having eight to fourteen carbon atoms, of five- or six-membered heterocyclic monocarboxylic acids whose ring contains one or two nitrogen, oxygen or sulfur atoms as ring members and whose ring has a quasi-aromatic structure or cycloaliphatic carboxylic acids having four to thirteen carbon atoms. All these carboxylic acid anhydrides or carboxylic acid chlorides or carboxylic acid bromides may bear one to three chlorine or bromine atoms as substituents. Alkyl esters of chloroformic acid whose alkyl groups contain one to four carbon atoms are also suitable as acylating agents according to this invention. These preferred acylating agents may be represented by the formula:

in which $R^4$ denotes hydrogen, alkyl having one to ten carbon atoms, alkyl having one to ten carbon atoms and bearing one to three chlorine or bromine atoms as substituents, aryl having six to twelve carbon atoms, aryl having six to twelve carbon atoms and bearing one to three chlorine or bromine atoms, such as phenyl, chlorophenyl, 2,4 - dichlorophenyl, 2,4,5 - trichlorophenyl, 2-bromophenyl, 4-bromophenyl, 2,6-dibromophenyl, naphthyl, 2 - chloronaphthyl, 2,6 - dibromonaphthyl, 1,6-dichloronaphthyl, 2,6,7 - tribromonaphthyl or 2 - chloro-6-bromonaphthyl, aralkyl having seven to twelve carbon atoms, cycloalkyl having three to twelve carbon atoms which may bear one to three chlorine or bromine atoms, or a five- or six-membered quasi-aromatic heterocyclic ring which contains one or two sulfur, oxygen or nitrogen atoms as ring members. The radical $R^6$ denotes a chlorine or bromine atom or the radical —O—CO—$R^9$ in which $R^9$ has the above meaning. The radical $R^6$ may also denote a chlorine atom if the radical $R^9$ denotes an alkoxy group with alkyl having one to four carbon atoms.

Ketenes having the general formula:

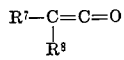

may also be used as acylating agents. In this formula $R^7$ and $R^8$ denote hydrogen or phenyl.

Examples of acylating agents which may be used are acetic anhydride, propionic anhydride, butyric anhydride, the mixed anhydride of butyric acid and acetic acid, the mixed anhydride of acetic acid and formic acid, β-chloropropionyl chloride, p-chlorobenzoic anhydride, benzoic anhydride, acetyl chloride, benzoyl chloride, nicotinyl chloride, methyl chloroformate, methyl bromoformate, ethyl chloroformate, ethyl bromoformate, benzoyl bromide, ketene, diphenylketene and phenylketene. Further suitable acylating agents are for instance a 4-methyloxazole carboxylic acid chloride-(5), quinoline-2-carboxylic acid chloride, cyclohexane carboxylic acid anhydride, phenylacetic acid chloride, pyrimidine carboxylic acid chloride-(5), imidazole carboxylic acid anhydride, thiophene carboxylic acid chloride, bromoacetic acid bromide, dichloroacetic acid chloride, undecane carboxylic acid anhydrde, cyclopentane carboxylic acid chloride, 3,4,5-trichlorobenzoic acid bromide, indane carboxylic acid anhydride, cyclopentane carboxylic acid chloride, valeric acid anhydride, diphenylacetic acid chloride, 4-phenylthiazole carboxylic acid chloride-(5), 4-bromothiazole bromide of imidazole carboxylic acid chloride-(5).

The process may be carried out in either the presence of absence of a base. When using an acylating agent of the formula

where $R^4$ and $R^6$ have the meanings given above (i.e. carboxylic acid anhydrides, chlorides or bromides) the presence of a base is expedient. It is advantageous to use at least one equivalent of base per equivalent of acylating agent, but a larger amount of base, for example up to five equivalents, may also be employed. In the latter case the excess base assumes the function of a solvent. Suitable bases are organic bases, for example, tertiary amines, such as pyridine, quinoline, diethylcyclohexylamine, butyldimethylamine, triethylamine, N-methylpiperidine or N-phenylpyrrolidine. Other bases which may be used are aqueous solutions of the hydroxides of the alkaline and alkaline earth metals, e.g. sodium, potassium or barium hydroxide solution or milk of lime. As the above list shows, a great variety of different bases may be used for the reaction according to the present invention. Generally speaking, all compounds may be used which have an alkaline reaction and whose pK-value is smaller than that of the ylide to be prepared.

The reaction of the sulfonium ylides is preferably carried out in the presence of a solvent which is inert to the acylating agent, the sulfonium ylide and any base used. Examples of suitable solvents are hydrocarbons having six to twelve carbon atoms, such as hexane, heptane, cyclohexane, methylcyclohexane, benzene, toluene, the xylenes or 1,2,3,4-tetrahydronaphthalene; chlorohydrocarbons, such as chlorobenzene, chloroform, carbon tetrachloride, 1,2-dichloroethane, 1,4-dichlorobutane or 1,6-dichlorohexane; carboxylic acid nitriles, such as acetonitrile, benzonitrile or propionitrile; and dialkyl-substituted lower carbonamides in which the alkyl groups have one to four carbon atoms, such as dimethylformamide, diethylformamide and N-methylpyrrolidone. Other suitable solvetns are for example ethers such as diethyl ether, dibutyl ether, tetrahydrofuran or dioxane, sulfoxides such as dimethyl sulfoxide, diethyl sulfoxide or sulfolane. The above-mentioned bases, provided they are used in excess, tris-dimethylaminophosphine and water, if the sulfonium ylide is stable in water, may also be used as solvents.

Reactions with dimethyl-oxo-sulfonium methylide are preferably carried out in dimethyl sulfoxide, dimethyl formamide or tetrahydrofuran as solvents. The carbonamide substituted sulfonium ylides or products which have been partially acylated are reacted with further acylating agent in aqueous alkaline suspension or advantageously in an organic base as solvent.

The reaction temperature may be chosen at from about −30° to about +150° C. and is limited by the solubility properties and the boiling point of the solvent and also by thermal stability of the ylide used. A preferred temperature range is from 0° to 50° C.

The acylation leads primarily to oxo-sulfonium salts having the general formula:

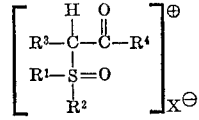

in which $R^1$, $R^2$, $R^3$ and $R^4$ have the meanings given above and X denotes chlorine, bromine or O—CO—$R^4$ where $R^4$ has meanings given above. If $R^3$ in the said formula denotes hydrogen, there are obtained from the oxo-sulfonium salt by treatment with strong bases (analogously to the production of dimethyl-oxo-sulfonium methylide from trimethyl-oxo-sulfonium salts) oxo-sulfonium ylides in which the radical

is already present and which may then be used as starting materials for the process according to this invention.

If a ketene be used as acylating agent, a base is not necessary to produce oxo-sulfonium ylides in which the radical

is present and which may then be used as starting materials for the process according to this invention. The stabilization of the primary product, for example from diphenyl ketene:

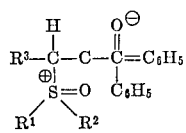

can take place probably by intramolecular proton migration. For the partial acylation of dimethyl-oxo-sulfonium methylide it is advantageous to use 0.1 to 1 equivalent of acylating agent. The reaction product may be isolated for example either by distilling off the solvent, optionally under subatmospheric pressure, by pouring onto ice and suction filtration of the precipitate or by extraction of the reaction mixture which has been diluted with water. The crude product may be recrystallized from a suitable solvent such as ethyl acetate, benzene, methanol, ethanol or cyclohexane.

The group

contained in the compounds obtainable by the process according to the present invention can be removed by treatment with Raney nickel in a hydrogen atmosphere at normal pressure and temperatures between 10° and 60° C., ketones, 1,3-diketones, carboxylic acid amides or malonic acid diamides being obtained according to the starting material used. These substances are valuable intermediates for the manufacture of pharmaceuticals, dyes and pesticides.

The new sulfur-containing compounds obtainable according to the invention are furthermore suitable for use as polymerization modifiers. For example in the free radical polymerization of styrene the degree of polymerization and the rate of polymerization can be substantially influenced by adding for example 3 to 20% by weight of an acyl-oxo-sulfonium ylide. By polymerizing 15 g. of styrene in 15 g. of pure tetrahydrofuran at 100° C. using conventional conditions and adding 1 g. of an acyl-oxo-sulfonium ylide of the formula

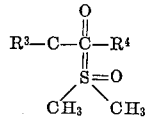

the rates of polymerization $\nu$ (in percent conversion per hour) and the means molecular weights $\overline{M}$ given in the following table were obtained.

TABLE

| Additive | | $\nu$ | $\overline{M}$ |
|---|---|---|---|
| 1 | | 0.21 | 370,000 |
| 2 | $R^4=C_6H_5—$<br>$R^3=H$ | 0.14 | 430,000 |
| 3 | $R^4=H$<br>$R^3=CH(C_6H_5)_2$ | 0.15 | 450,000 |
| 4 | $R^4=H$<br>$R^3=CH_3—$ | 0.067 | |
| 5 | $R^4=CH_3—$<br>$R^3=CH_3—$ | 0.083 | |
| 6 | $R^4=C_6H_5—$<br>$R^3=C_6H_5—$ | 0.317 | 180,000 |
| 7 | $R^4=C_6H_5—$<br>$R^3=C_6H_5NH—$ | 0.40 | 310,000 |

The table shows that by adding oxo-sulfonium ylides the rate of polymerization can be substantially decreased (experiments 3 and 4) and the mean molecular weight of polystyrene can be influenced within wide limits (experiments 2, 3, 6 and 7).

The invention is further illustrated by the following examples in which parts are parts by weight. They bear the same relation to parts by volume as the gram to the ccm.

Example 1

2.67 parts of 90% sodium hydride is added to a solution of 22 parts of trimethyl-oxo-sulfonic iodide in 200 parts of dimethyl sulfoxide and, when disengagement of gas has ended, 17 parts of diphenyl ketene is added. Red coloration and slight heating up are observed. The whole is stirred for another hour, poured onto ice and the solution is extracted with ether. The ether extract is washed with water, dried and concentrated. 10.72 parts of dimethyl-oxo-sulfurylenemethyl benzhydryl ketone is thus isolated as a reddish solid which, after having been recrystallized from ethyl acetate, is colorless and melts at 147° C.

Analysis.—$C_{17}H_{18}O_2S$ (molecular weight 286). Calculated: C, 71.2%; H, 6.7%; O, 11.2%; S, 11.2%. Found: C, 71.0%; H, 6.9%; O, 10.9%; S, 11.3%.

According to infrared and nuclear magnetic resonance (NMR) spectra, the compound has the following structure:

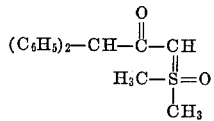

Example 2

7.6 parts of benzoic anhydride is dissolved in 20 parts of absolute benzene and slowly added at 20° C. to a solution of 6.0 parts of dimethyl-oxo-sulfonium methylide in 360 parts of dimethyl sulfoxide. The whole is stirred for another hour, the deposited salts are suction filtered and the solvent is distilled off from the filtrate. The residue is extracted exhaustively with hot benzene and the extracts are concentrated. 4.75 parts of dimethyl-oxo-sulfurylene acetophenone is obtained as colorless crystals having a melting point of 119° to 120° C.

Analysis.—$C_{10}H_{12}SO_2$ (molecular weight 196.3). Calculated: C, 61.2%; H, 6.2%; S, 16.3%; O, 16.3%. Found: C, 61.5%; H, 6.3%; S, 16.0%; O, 15.9%.

The following structure is moreover supported by spectroscopic results and by the reaction below:

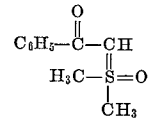

11.9 parts of phenyl isocyanate is reacted with 19.6 parts of the dimethyl-oxo-sulfurylene acetophenone of Example 2 in benzene solution and the product is concentrated. 20.6 parts of a product is obtained which in every respect is identical with the dimethyl-oxo-sulfurylene benzoyl acetanilide obtained according to Example 4.

Example 3

2.0 parts of dimethyl-oxo-sulfurylene acetophenone according to Example 2 is heated with 2.3 parts of benzoic anhydride in 20 parts of pyridine for five hours at 50° C. The solvent is distilled off under subatmospheric pressure and the product is extracted with a mixture of cyclohexane and ethyl acetate (8:2) while hot and recrystallized from cyclohexane. 3.7 parts of colorless crystals having a melting point of 137° to 138° C. is obtained. According to the results of analysis, infrared and nuclear resonance spectra, the product is the monohydrate of dimethyl-oxo-sulfurylene dibenzoylmethane:

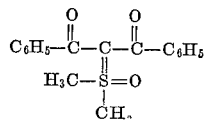

Analysis.—$C_{17}H_{18}SO_4$ (molecular weight 318.37). Calculated: C, 64.3%; H, 5.7%; S, 10.0%; O, 20.0%. Found: C, 64.7%; H, 6.0%; S, 9.7%; O, 20.3%.

1.5 parts of dimethyl-oxo-sulfurylene dibenzoylmethane is dissolved in 100 parts of methanol. Then 1.5 parts of Raney nickel is added and the mixture heated to 50° C. while passing a stream of hydrogen through the reaction vessel at normal pressure. After 30 minutes the whole is cooled, the catalyst separated and the methanol substantially removed by evaporation. 0.9 part of dibenzoylmethane having a melting point of 78° C. crystallizes out.

Example 4

2.11 parts of dimethyl-oxo-sulfurylene acetanilide and 3 parts of benzoyl chloride are intimately mixed with 20 parts of 2 N caustic soda solution. Ten minutes later, the precipitate is suction filtered, washed with ether and water and 2.97 parts of dimethyl-oxo-sulfurylene benzoylacetnilide is obtained which, after having been recrystallized from benzene, gives colorless crystals having a melting point of 160° C.

*Analysis.*—C₁₇H₁₇O₃NS (molecular weight 315.4). Calculated: C, 65.0%; H, 5.4%; N, 4.5%; S, 10.2%. Found: C, 65.4%; H, 5.6%; N, 4.6%; S, 9.9%.

The compound has the following structural formula:

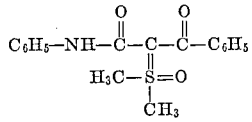

Example 5

2.11 parts of dimethyl-oxo-sulfurylene acetanilide and 5 parts of acetic anhydride are dissolved in 50 parts of pyridine at room temperature. Twelve hours later, the pale yellow solution is concentrated and the solid residue is recrystallized from methanol. 3.15 parts of dimethyl-oxosulfurylene acetoacetic anilide is obtained as colorless crystals having a melting point of 161° C.

*Analysis.*—C₁₂H₁₅NO₃S (molecular weight 253.2). Calculated: C, 57.0%; H, 6.0%; O, 18.9%; N, 5.4%; S, 12.5%. Found: C, 57.3%; H, 6.0%; O, 18.8%; N, 5.5%; S, 12.5%.

The compound has the following structural formula:

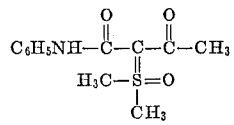

When treating a solution of dimethyl-oxo-sulfurylene acetoacetic anilide analogously to Example 3 the acetoacetic anilide obtained has a melting point of 85° C.

Example 6

10.2 parts of acetic anhydride is slowly added at 15° C. during the course of forty-five minutes to a solution of dimethyl-oxosulfonium methylide which has been prepared from 44 parts of trimethyl-oxo-sulfonium iodide and 5.34 parts of 90% sodium hydride in 400 parts by volume of dimethyl sulfoxide. The whole is stirred for another thirty minutes at 15° C. and for another fifteen hours at 25° C. and then concentrated under subatmospheric pressure. The residue is extracted several times with hot ethyl acetate. After concentration, 13.75 parts of a yellow oil is obtained which according to the infrared spectrum and the reaction described below consists mainly of dimethyl-oxo-sulfurylene acetone:

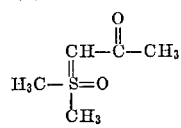

1.19 parts of phenyl isocyanate in 10 parts of benzene is added to 1.34 parts of the said oil, and the product is concentrated and recrystallized from methanol. 2.01 parts of a product having a melting point of 161° C. is obtained which is identical in every respect with the product of Example 5.

Example 7

A solution of dimethyl-oxo-sulfonium methylide is prepared from 44 parts of trimethyl-oxo-sulfonium iodide, 200 parts of dimethyl-formamide and 5.34 parts of sodium hydride. 20.4 parts of pure acetic anhydride is added while cooling. An amorphous precipitate of 31.3 parts of trimethyl-oxo-sulfonium iodide is formed which is suction filtered. The filtrate is evaporated to dryness, the solid residue is extracted with ethyl acetate and 7 parts of colorless dimethyl-oxo-sulfurylene acetylacetone is recovered therefrom. After having been recrystallized from ethyl acetate, it melts at 178° to 180° C.

*Analysis.*—C₇H₁₂O₃S (molecular weight 176). Calculated: C, 47.7%; H, 6.9%; O, 27.2%; S, 18.2%. Found: C, 47.8%; H, 6.8%; O, 27.5%; S, 18.4%.

On the basis of infrared and NMR spectra, the following structural formula may be assigned to the compound:

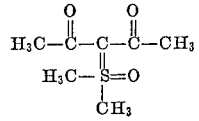

When treating a solution of dimethyl-oxo-sulfurylene acetylacetone in methanol with Raney nickel analogously to Example 3 the acetylacetone obtained has a melting point of 139° C.

Example 8

4.22 parts of dimethyl-oxo-sulfurylene acetanilide and 1.08 parts of ethyl chloroformate are heated with 40 parts of acetonitrile for three hours at 50° C. The whole is allowed to cool, 2.35 parts of the hydrochloride of dimethyl-oxo-sulfurylene acetanilide is suction filtered and the acetonitrile solution is concentrated under subatmospheric pressure. The residue is digested cold with dilute hydrochloric acid, suction filtered and recrystallized from a little methanol. 2.59 parts of dimethyl-oxo-sulfurylene malonic anilide diethyl ester is obtained having a melting point of 126° C. The yield is 91% of the theory.

*Analysis.*—C₁₃H₁₇NO₄S (molecular weight 283.3). Calculated: C, 55.1%; H, 6.0%; O, 22.6%; N, 5.0%; S, 11.3%. Found: C, 55.4%; H, 6.1%; O, 27.7%; N, 4.8%; S, 11.1%.

Spectral data support the structure:

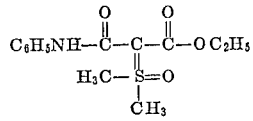

Example 9

Example 8 is repeated with the difference that 1.41 parts of nicotinyl chloride is used instead of the chloroformic ester and the reaction is carried out while cooling with ice. After three hours, 2.47 parts of the hydrochloride of the dimethyl-oxo-sulfurylene used is suction filtered. The filtrate is concentrated. A pale brown product is obtained from which α-(4-pyridoyl)-dimethyl-oxo-sulfurylene acetanilide is obtained by recrystallization from a little ethanol as a pale yellow solid having a melting point of 163° to 164° C. The yield is 1.74 parts, which is 55% of the theory.

*Analysis.*—C₁₆H₁₆N₂O₃S (molecular weight 316.4). Calculated: C, 60.7%; H, 5.1%; N, 8.9%; O, 15.2%; S, 10.1%. Found: C, 60.9%; H, 5.4%; N, 9.1%; O, 14.9%; S, 9.7%.

Spectral data support the compound having the structure:

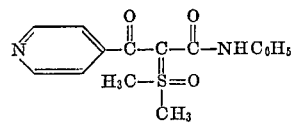

Example 10

A solution of dimethyl-oxo-sulfonium methylide in dimethylformamide is prepared as described in Example 7 and 13 parts of benzyl chloride is dripped in in the course of one hour at 0° to 5° C. The whole is stirred for another hour and then 11.3 parts of benzoic anhydride is added at 0° C. to the mixture of the ylides of dimethyl-β-phenylethyl-oxo-sulfonium iodide thus obtained. The dimethylformamide is distilled off at 50° C. and a pressure of 0.3 mm. Hg, the residue is extracted with benzene, and the extract is washed with water, dried over sodium sulfate and concentrated. A light yellow viscous composition is obtained from whose spectral data the following groupings may be recognized:

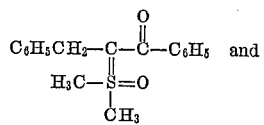 and 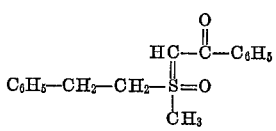

The analysis of the mixture corresponds to the empirical formula given:

*Analysis.*—$C_{17}H_{18}O_2S$ (molecular weight 286.4). Calculated: C, 71.5%; H, 6.3%; O, 11.2%; S, 11.2%. Found: C, 71.9%; H, 6.0%; O, 11.5%; S, 10.8%.

The yield is 9.16 parts, equivalent to 64% of the theory.

Example 11

21.1 parts of dimethyl-oxo-sulfurylene acetanilide is suspended in 60 parts of dry acetonitrile and, while stirring at 0° C., 6.30 parts of β-chloropropionyl chloride is slowly added. Forty minutes later, another 6.30 parts of the acid chloride is added, the suspension is brought into solution at 0° C. by adding methanol and then an excess of 5% caustic soda solution is dripped in. The reaction solution is concentrated at 20° C. at a pressure of 10 mm. Hg, and the precipitate formed is suction filtered and recrystallized from a mixture of a small amount of ethyl acetate and a large amount of cyclohexane. 21.1 parts (71% of the theory) of dimethyl-oxo-sulfurylene (β-chloropropionyl)-acetanilide is obtained as almost colorless crystals having a melting point of 141° C. (with decomposition).

*Analysis.*—$C_{13}H_{16}ClNO_3S$ (molecular weight 301.8). Calculated: C, 51.9%; H, 5.4%; Cl, 11.8%; N, 4.7%; O, 15.9%; S, 10.6%. Found: C, 52.2%; H, 5.1%; Cl, 11.6%; N, 4.5%; O, 16.3%; S, 10.3%.

Spectral data of the compound support the following structure:

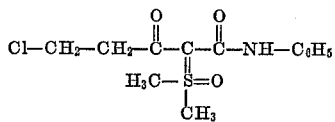

We claim:

1. A process for the production of sulfur-containing compounds having the formula:

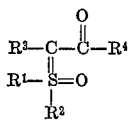

in which $R^1$ and $R^2$ denote members selected from the group consisting of alkyl having 1 to 4 carbon atoms and aralkyl having 7 to 10 carbon atoms, $R^3$ denotes a member selected from the group consisting of hydrogen, alkyl having 1 to 4 carbon atoms, aralkyl having 7 to 10 carbon atoms,

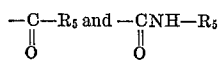

$R^5$ denoting alkyl having 1 to 10 carbon atoms, aralkyl having 7 to 13 carbon atoms, aryl having 6 to 12 carbon atoms, and the heterocyclic five- to six-membered quasi-aromatic ring selected from the group consisting of pyridyl, pyrimidinyl, imidiazolyl, thiazolyl, thiophene and quinolinyl radicals, $R^4$ denotes a member selected from the group consisting of hydrogen, alkyl having 1 to 10 carbon atoms, alkyl having 1 to 10 carbon atoms substituted by one to three halogen atoms, cycloalkyl having 3 to 12 carbon atoms, cycloalkyl having 3 to 12 carbon atoms substituted by one to three halogen atoms, aryl having 6 to 12 carbon atoms, aryl having 6 to 12 carbon atoms substituted by one to three halogen atoms, aralkyl having 7 to 12 carbon atoms, a heterocyclic five- to six-membered quasi-aromatic ring selected from the group consisting of pyridyl, pyrimidinyl, imidiazolyl, thiazolyl, thiophene and quinolinyl radicals, a heterocyclic five- to six-membered quasi-aromatic ring which contains 1 or 2 sulfur, oxygen or nitrogen atoms as ring members substituted by one to three halogen atoms, alkoxy having 1 to 4 carbon atoms and the radical

in which $R^7$ and $R^8$ denote members selected from the group consisting of hydrogen and phenyl which comprises reacting an oxosulfonium ylide having the formula:

in which $R^1$, $R^2$ and $R^3$ have the meanings given above at temperatures of from −30° to +150° C. with an acylating agent selected from the group consisting of a compound having the formula:

in which $R^4$ has the meaning given above and $R^6$ denotes a member selected from the group consisting of chlorine, bromine and the radical —O—CO—$R^9$, $R^9$ denoting a member selected from the group consisting of alkyl having 1 to 10 carbon atoms, alkyl having 1 to 10 carbon atoms substituted by one to three halogen atoms, cycloalkyl having 3 to 12 carbon atoms, cycloalkyl having 3 to 12 carbon atoms substituted by one to three halogen atoms, aryl having 6 to 12 carbon atoms, aryl having 6 to 12 carbon atoms substituted by one to three halogen atoms, aralkyl having 7 to 13 carbon atoms, alkoxy having 1 to 4 carbon atoms and a heterocyclic five-to six-membered quasi-aromatic ring selected from the group consisting of pyridyl, pyrimidinyl, imidiazolyl, thiazolyl, thiophene and quinolinyl radicals, and a compound having the formula:

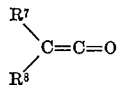

where $R^7$ and $R^8$ have the means given above.

2. A process as claimed in claim 1 carried out in the presence of a base.

3. A process as claimed in claim 1 carried out in the presence of an inert solvent.

4. Sulfur-containing compounds having the formula:

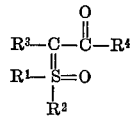

in which $R^1$ and $R^2$ denote members selected from the group consisting of alkyl having 1 to 4 carbon atoms and aralkyl having 7 to 10 carbon atoms, $R^3$ denotes a member selected from the group consisting of hydrogen, alkyl having 1 to 4 carbon atoms, aralkyl having 7 to 10 carbon atoms,

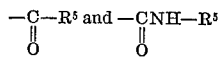

$R^5$ denoting alkyl having 1 to 10 carbon atoms, aralkyl having 7 to 13 carbon atoms, aryl having 6 to 12 carbon atoms and the heterocyclic five- to six-membered quasi-aromatic ring selected from the group consisting of pyridyl, pyrimidinyl, imidiazolyl, thiazolyl, thiophene and quinolinyl radicals, $R^4$ denotes a member selected from the group consisting of hydrogen, alkyl having 1 to 10 carbon atoms, alkyl having 1 to 10 carbon atoms substituted by one to three halogen atoms, cycloalkyl having 3 to 12 carbon atoms, cycloalkyl having 3 to 12 carbon atoms substituted by one to three halogen atoms, aryl having 6 to 12 carbon atoms, aryl having 6 to 12 carbon atoms substituted by one to three halogen atoms, aralkyl having 7 to 12 carbon atoms, a heterocyclic five- to six-membered quasi-aromatic ring selected from the group consisting of pyridyl, pyrimidinyl, imidiazolyl, thiazolyl, thiophene and quinolinyl radicals, a heterocyclic five- to six-membered quasi-aromatic ring selected from the group consisting of pyridyl, pyrimidinyl, imidiazolyl, thiazolyl, thiophene and quinolinyl radicals substituted by one to three halogen atoms, alkoxy having 1 to 4 carbon atoms and the radical $$R^7-\underset{R^8}{\underset{|}{C}H}-$$

in which $R^7$ and $R^8$ denote members selected from the group consisting of hydrogen and phenyl.

5. Any substance having the general formula:

$$\underset{\underset{R^2}{\overset{|}{R^1-S=O}}}{\overset{\overset{O}{\|}}{R^3-C-\overset{\|}{C}-R^4}}$$

in which $R^1$ and $R^2$ denote alkyl having 1 to 4 carbon atoms or aralkyl having 7 to 10 carbon atoms, $R^3$ denotes hydrogen, alkyl having 1 to 4 carbon atoms, aralkyl having 7 to 10 carbon atoms, the acyl radical $$-\underset{O}{\overset{\|}{C}}-R^5$$

or the carbonamide radical $$-\underset{O}{\overset{\|}{C}}-NHR^5$$

$R^5$ denoting alkyl having 1 to 10 carbon atoms, aralkyl having 7 to 13 carbon atoms, aryl having 6 to 12 carbon atoms or a heterocyclic five- to six-membered quasi-aromatic ring selected from the group consisting of pyridyl, pyrimidinyl, imidiazolyl, thiazolyl, thiophene and quinolinyl radicals, and $R^4$ denotes hydrogen, alkyl having 1 to 10 carbon atoms, alkyl having 1 to 10 carbon atoms substituted by one to three halogen atoms, cycloalkyl having 3 to 12 carbon atoms, cycloalkyl having 3 to 12 carbon atoms substituted by one to three halogen atoms, aryl having 6 to 12 carbon atoms, aryl having 6 to 12 carbon atoms substituted by one to three halogen atoms, aralkyl having 7 to 12 carbon atoms, a heterocyclic five- to six-membered quasi-aromatic ring selected from the group consisting of pyridyl, pyrimidinyl, imidiazolyl, thiazolyl, thiophene and quinolinyl radicals, which is unsubstituted or substituted by one to three halogen atoms, alkoxy having 1 to 4 carbon atoms or the radical $$R_7-\underset{R_8}{\underset{|}{\overset{H}{\overset{|}{C}}}}-$$

$R^7$ and $R^8$ denoting hydrogen or phenyl.

6. Dimethyl-oxo-sulfurylene methyl benzhydryl ketone.
7. Dimethyl-oxo-sulfurylene acetophenone.
8. Dimethyl-oxo-sulfurylene malonic anilide diethyl ester.
9. α-(4-pyridoyl)-dimethyl-oxo-sulfurylene acetanilide.

References Cited

Konig et al., Tetrahedron Letters, vol. 39, pp. 3003–5 (September 1964).

Konig et al., Chemical Abstracts, par. 1589–d–g, June 1965.

HENRY R. JILES, *Primary Examiner.*

A. L. ROTMAN, *Assistant Examiner.*

U.S. Cl. X.R.

260—251, 256.5, 93.5, 287, 295, 289, 302, 309, 332.2, 332.3, 347.2, 470, 562, 590, 592, 599, 601

UNITED STATES PATENT OFFICE
CERTIFICATE OF CORRECTION

Patent No. 3,442,901                                May 6, 1969

Horst Koenig et al.

It is certified that error appears in the above identified patent and that said Letters Patent are hereby corrected as shown below:

In the heading to the printed specification, after line 7, insert -- Claims priority, application Germany, July 21, 1964, B 77,768 --. Column 3, line 13, "2,4,5" should read -- 2,4,6 --.

Signed and sealed this 5th day of May 1970.

(SEAL)
Attest:

Edward M. Fletcher, Jr.                      WILLIAM E. SCHUYLER, JR.

Attesting Officer                               Commissioner of Patents